S. MASTERS.
MEANS FOR FIXING BOSSES UPON THEIR SHAFTS.
APPLICATION FILED JAN. 5, 1907.
923,678. Patented June 1, 1909.
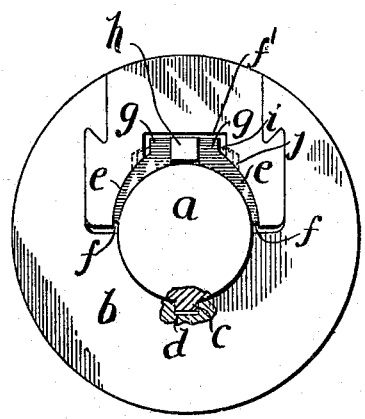
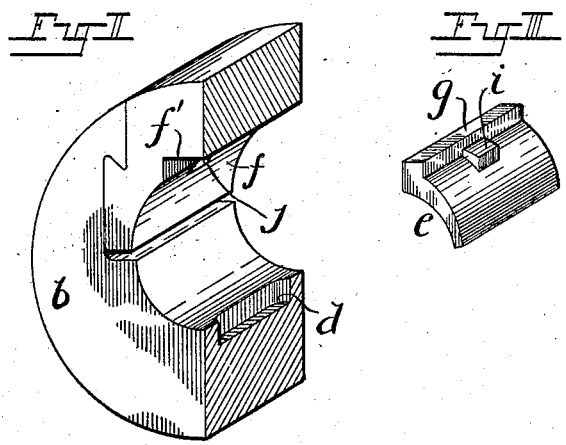
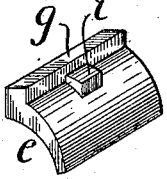
Witnesses:
L. Waldman
C. Heymann
Inventor
Stephen Masters
by B. Singer
atty

UNITED STATES PATENT OFFICE.

STEPHEN MASTERS, OF CLEVELAND, TRANSVAAL.

MEANS FOR FIXING BOSSES UPON THEIR SHAFTS.

No. 923,678.      Specification of Letters Patent.      Patented June 1, 1909.

Application filed January 5, 1907. Serial No. 350,999.

*To all whom it may concern:*

Be it known that I, STEPHEN MASTERS, a British subject, residing at the New Heriot Gold Mining Company, Cleveland, in the Colony of the Transvaal, have invented certain new and useful Improvements in Means for Fixing Bosses upon Their Shafts, of which the following is a specification, reference being had therein to the accompanying drawings.

The object of the present invention is to provide a strong and effective means for securing bosses generally and more especially stamp cams and pulley hubs upon their shafts or spindles.

A particular object of the invention is to provide for stamp cams a fixing means combining a feather by which force is positively transmitted between the shaft and the cam, and creeping of the cam is prevented, with a wedging device by which the actual locking of the cam upon the shaft is effected and which permits such operation or its reverse to be accomplished with more ease and certainty than with existing means.

In the accompanying drawings the invention is illustrated as applied to the boss of a divided cam such as is described in patent application No. 323,067, in which connection the present fixing means is of special utility.

Figure I is an end view of the cam upon the shaft and Fig. II a perspective view of the cam boss severed vertically; Fig. III a perspective view of one of the curved wedges hereinafter referred to.

Referring to Figs. I–III, $a$ indicates the shaft and $b$ the cam boss which although here shown divided may as far as concerns the present invention equally well be solid. The actual transmission of force between the shaft and the boss is effected by means of a key or feather $c$ secured in this instance to the shaft. To prevent longitudinal displacement of the cam upon the shaft the featherway $d$ in the internal surface of the cam is preferably closed at each end, the feather being made of corresponding length.

For tightening the cam upon the shaft and locking the driving feather in the operative position there is provided a pair of curved wedges $e, e$ which are of uniform section longitudinally. The wedges are adversely disposed in a correspondingly shaped recess $f$ formed in the cam substantially opposite to the feather, and their inner faces bear against the shaft. The adjacent thick ends of the wedges are provided with enlarged heads $g$ extending throughout their length, the recess $f$ being enlarged at $f^1$ to accommodate said heads.

The wedges are forced apart preliminarily if necessary by a taper drift and are finally tightened by driving in between them a very slightly tapered key $h$ which is then left in place. The heads $g$ are set slightly askew upon the wedges so that when in place they fit snugly to the key $h$.

In unshipping the cam, the key $h$ is knocked out and a taper drift is forced between each head and the adjacent shoulder of the recess $f^1$ thereby loosening the wedges.

Where the feather-slot is closed at the ends, the wedges are made of such thickness that when they are removed the cam may be passed over the key $c$ which is then sunk into its slot $d$, whereupon the wedges are slid endwise into place and tightened up as before.

The wedges may be provided with lugs $i$ which when the wedges are tightened up pass into sockets $j$ in the shoulders of their recesses and so entirely obviate the possibility of the wedges working out at the ends of the cam.

I claim as my invention:—

1. In combination, a shaft, a collar therefor, said shaft and collar being provided with a key and key-way respectively for preventing rotative and longitudinal movement of the collar with respect to the shaft, said collar being bored to receive said shaft and said bore having an eccentric portion, companion wedge members disposed in said eccentric portion of the bore, and a locking wedge movable parallel with the axis of the shaft for displacing said wedges in opposite directions to frictionally lock said collar on said shaft and bring said key and key-way into locking relation.

2. In combination, a shaft, a collar therefor, said shaft and collar being provided with a key and key-way respectively preventing rotative and longitudinal movement of the collar with respect to the shaft, said collar being bored to receive said shaft and said bore having an eccentric portion provided with recesses, companion wedge members disposed in said eccentric portion of the bore and provided with lugs engaging said recesses, and a locking wedge movable parallel with the axis of the shaft for displacing said wedges in opposite directions to frictionally lock said collar on said shaft and bring said key and key-way into locking relation.

In testimony whereof I affix my signature in presence of two witnesses.

STEPHEN MASTERS.

Witnesses:
 ALFRED L. SPOOR,
 HAROLD E. KIRCH.